United States Patent
Hodges et al.

(10) Patent No.: US 9,606,635 B2
(45) Date of Patent: Mar. 28, 2017

(54) INTERACTIVE BADGE

(71) Applicant: MICROSOFT TECHNOLOGY LICENSING, LLC, Redmond, WA (US)

(72) Inventors: Stephen Edward Hodges, Cambridge (GB); Norman Timo Pohl, Kirchheim unter Teck (DE); John Helmes, Tegelen (NL); Nicolas Villar Martinez, Cambridge (GB); Timothy S. Paek, Sammamish, WA (US); Johnson Tan Apacible, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 13/769,070

(22) Filed: Feb. 15, 2013

(65) Prior Publication Data

US 2014/0232632 A1 Aug. 21, 2014

(51) Int. Cl.
  *G06F 3/03* (2006.01)
  *G06F 3/01* (2006.01)
  *G06F 3/0346* (2013.01)

(52) U.S. Cl.
  CPC .............. *G06F 3/03* (2013.01); *G06F 3/017* (2013.01); *G06F 3/0346* (2013.01)

(58) Field of Classification Search
  CPC ............. G06K 19/07703; G06K 19/07; G06K 19/0723; G06Q 20/3574; G06Q 20/363; G06Q 20/4014; G06F 3/017; G06F 3/0346; G06F 1/1626; G06F 1/1694; G06F 3/14; G06F 3/03

USPC .................. 320/138–139; 345/3.1, 182, 156
  See application file for complete search history.

(56) References Cited

U.S. PATENT DOCUMENTS

| | | | |
|---|---|---|---|
| 6,711,414 B1 | 3/2004 | Lightman et al. | |
| 6,853,293 B2 * | 2/2005 | Swartz et al. | 340/5.92 |
| 7,103,379 B2 * | 9/2006 | Hilerio | 455/556.1 |
| 7,499,002 B2 * | 3/2009 | Blasko et al. | 345/3.1 |
| 8,200,520 B2 | 6/2012 | Chen et al. | |
| 8,279,716 B1 | 10/2012 | Gossweiler et al. | |
| 8,812,419 B1 | 8/2014 | King et al. | |
| 2002/0030094 A1 * | 3/2002 | Curry et al. | 235/375 |
| 2003/0001722 A1 * | 1/2003 | Smith | 340/5.61 |
| 2003/0046401 A1 | 3/2003 | Abbott et al. | |
| 2005/0198029 A1 * | 9/2005 | Pohja et al. | 707/8 |

(Continued)

FOREIGN PATENT DOCUMENTS

| | | |
|---|---|---|
| KR | 1020070106900 A | 11/2007 |
| WO | 2008/000039 A1 | 1/2008 |

OTHER PUBLICATIONS

"International Search Report & Written Opinion for PCT Application No. PCT/US2014/016157", Mailed Date: May 9, 2014, Filed Date: Feb. 13, 2014, 10 Pages.

(Continued)

*Primary Examiner* — Lun-Yi Lao
*Assistant Examiner* — Elliott Deaderick

(57) ABSTRACT

A wearable interactive device, such as a wearable identity badge is disclosed. When a user moves the device, such as to position a display (e.g., part) of the device a sensed distance at a sensed horizontal and vertical angle, the device outputs content that is based on the position. Context data also may be used in determining the content to output, as well as any other sensed data that may be available.

20 Claims, 7 Drawing Sheets

(56) References Cited

U.S. PATENT DOCUMENTS

| | | | |
|---|---|---|---|
| 2005/0212749 A1* | 9/2005 | Marvit et al. | 345/156 |
| 2005/0212754 A1 | 9/2005 | Marvit et al. | |
| 2006/0022822 A1* | 2/2006 | Wong | A45F 5/02 |
| | | | 340/568.1 |
| 2007/0022384 A1 | 1/2007 | Abbott et al. | |
| 2007/0136694 A1 | 6/2007 | Friedman et al. | |
| 2007/0150512 A1 | 6/2007 | Kong et al. | |
| 2008/0014908 A1 | 1/2008 | Vasant | |
| 2008/0040187 A1 | 2/2008 | Carraher et al. | |
| 2008/0133663 A1 | 6/2008 | Lentz | |
| 2009/0174633 A1* | 7/2009 | Kumhyr | 345/82 |
| 2009/0195497 A1 | 8/2009 | Fitzgerald et al. | |
| 2009/0284216 A1* | 11/2009 | Bessa et al. | 320/101 |
| 2010/0156676 A1 | 6/2010 | Mooring et al. | |
| 2010/0162105 A1 | 6/2010 | Beebe et al. | |
| 2011/0003665 A1 | 1/2011 | Burton et al. | |
| 2011/0018731 A1 | 1/2011 | Linsky et al. | |
| 2011/0107236 A1 | 5/2011 | Sambhar | |
| 2011/0231493 A1 | 9/2011 | Dyor | |
| 2011/0300804 A1 | 12/2011 | Lu | |
| 2011/0314404 A1 | 12/2011 | Kotler et al. | |
| 2012/0023422 A1* | 1/2012 | Biton et al. | 715/764 |
| 2012/0075177 A1* | 3/2012 | Jacobsen et al. | 345/156 |
| 2012/0260192 A1 | 10/2012 | Detweiler | |
| 2012/0316456 A1* | 12/2012 | Rahman | G06F 1/163 |
| | | | 600/547 |
| 2013/0036117 A1 | 2/2013 | Fisher et al. | |
| 2013/0050164 A1* | 2/2013 | Rericha | 345/205 |
| 2013/0143535 A1* | 6/2013 | Leppanen | H04W 4/08 |
| | | | 455/414.1 |
| 2013/0222208 A1 | 8/2013 | Gorilovsky et al. | |
| 2013/0225117 A1* | 8/2013 | Giacoletto | H04W 4/22 |
| | | | 455/404.2 |

OTHER PUBLICATIONS

"Interactive Digital Displays", Retrieved On: Feb. 8, 2013, Available at: http://www.outform.com/outform_media/user_images/idisplay-brochure.pdf, 14 pages.

"The Affordable, Wearable Mobile Device Designed for Every Retail Associate", Retrieved On: Feb. 8, 2013, Available at: http://www.motorola.com/web/Business/Products/MOTOROLA_SB1/SB1-Smart-Badge-Spec-Sheet-081412_FINAL.pdf, 2 pages.

Want, et al., "The Active Badge Location System", In ACM Transactions on Information Systems (TOIS), vol. 10, Issue 1, Jan. 1992, 12 Pages.

Laibowitz, et al., "The Uber-Badge—A Versatile Platform at the Juncture between Wearable and Social Computing", Retrieved On: Feb. 8, 2013, Available at: http://ttt.media.mit.edu/research/276badgeocg.pdf, 6 pages.

Falk, et al., "Crossbreeding Wearable and Ubiquitous Computing: Design Experiences from the BubbleBadge", Retrieved On: Feb. 8, 2013, Available at: http://citeseerx.ist.psu.edu/viewdoc/download?doi=10.1.1.28.5109&rep=rep1&type=pdf, 11 pages.

Park, et al., "Design of a Wearable Sensor Badge for Smart Kindergarten", In Proceedings of the 6th IEEE International Symposium on Wearable Computers, Oct. 7, 2002, 8 Pages.

Addlesee, et al., "Implementing a Sentient Computing System", In IEEE Computer Magazine, vol. 34, No. 8, Aug. 2001, 7 Pages.

Blasko, et al., "Prototyping Retractable String-Based Interaction Techniques for Dual-Display Mobile Devices", In Proceedings of the SIGCHI Conference on Human Factors in Computing Systems, Apr. 2006, 4 Pages.

"Eink E-paper Products", Retrieved On: Feb. 11, 2013, Available at: http://www.eink.com/, 3 pages.

Jones, J. Cliff, "The Zenithal Bistable Device: From Concept to Consumer", In SID Symposium Digest of Technical Papers, vol. 38, Issue 1, May, 2007, 4 Pages.

Koch, et al., "Pull'n Retract: Experimenting with a String-based Wearable Input Device", In Proceeding of Sixth International Conference on Pervasive Computing, May 19, 2008, 4 Pages.

Koch, et al., "Prototyping a Chest-Worn String-Based Wearable Input Device", In Proceedings of the International Symposium on a World of Wireless, Mobile and Multimedia Networks, Jun. 23, 2008, 6 Pages.

Rantanen, et al., "Smart Clothing for the Arctic Environment", In Proceedings of the Fourth International Symposium on Wearable Computers, Oct. 16, 2000, 9 Pages.

"Sharp Memory LCD Technology", Retrieved On: Feb. 11, 2013, Available at: http://www.sharpmemorylcd.com/aboutmemorylcd.html, 3 pages.

"Set or Remove Reminders", Microsoft Outlook—NPL, Aug. 2010, 2 Pages.

Berry, et al., "PTIME: Personalized Assistance for Calendaring", In Journal of ACM Transactions on Intelligent Systems and Technology, vol. 2, Issue 4, Jul. 2011, 22 Pages.

Ehlen, et al., "Designing and Evaluating Meeting Assistants, Keeping Humans in Mind", In Proceedings of the 5th International Workshop on Machine Learning for Multimodal Interaction, Sep. 8, 2008, 7 Pages.

Oh, et al., "Learning User Preferences in Distributed Calendar Scheduling", In Proceedings of the 5th International Conference on Practice and Theory of Automated Timetabling, Aug. 18, 2004, 15 Pages.

Perey, Christine, "The Future of Business Meetings: Applications for AMI Technologies", Published on: Oct. 10, 2006, Available at: http://www.clubofamsterdam.com/content.asp?contentid=636, 7 pages.

Rienks, et al., "Pro-Active Meeting Assistants: Attention Please!", In Journal of AI & Society, vol. 23, Issue 2, Mar. 2009, pp. 213-231.

"International Search Report and Written Opinion Issued in PCT Application No. PCT/US2013/077689", Mailed Date: Jul. 9, 2014, 11 Pages.

"International Preliminary Report on Patentability Issued in PCT Application No. PCT/US2013/077689", Mailed Date: Jul. 9, 2014, 8 Pages.

"Second Written Opinion Issued in PCT Application No. PCT/US2014/016157", Mailed Date: Mar. 3, 2015, 4 Pages.

"Non Final Office Action Issued in U.S. Appl. No. 13/726,237", Mailed Date: Oct. 20, 2014, 22 Pages.

"Final Office Action Issued in U.S. Appl. No. 13/726,237", Mailed Date: Mar. 2, 2015, 19 Pages.

* cited by examiner

INTERACTIVE BADGE

BACKGROUND

People want quick, convenient and mobile access to their digital information. A typical example is when a person dealing with an upcoming meeting wants to view calendar data including the meeting time and location. Similar access to other information, such as email, social networking, and online services such as search, mapping, weather forecasting and traffic updates is also desirable to many users.

Contemporary mobile devices provide such information, but not necessarily quickly or conveniently. For example, a smartphone has certain limitations from an interaction point of view, as smartphone is very often carried in a pocket or bag, and therefore needs to be removed (and typically switched on and/or unlocked) before it can be used for further interaction. A laptop or tablet computing device computer similarly needs to be activated. Not only can this be inconvenient and awkward at times, but there are also other times when it is socially or professionally unacceptable do so, and/or undesirable to call attention to oneself while doing so.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which the position of a wearable interactive device relative to a wearer of the device is sensed as (at least part of) interaction with the device. Described is rendering output via the wearable interactive device based upon the interaction with the device, including determining the output that is rendered based at least in part upon the position data.

In one aspect, a wearable interactive device is described that includes an output mechanism configured to render output content. The output content is rendered based at least in part upon interaction that positions the wearable interactive device at a position relative to a wearer of the interactive wearable device. At least part of the wearable interactive device may comprise an identity badge.

In one aspect, there is described obtaining context data and sensing position data of a wearable interactive badge relative to a wearer, including sensing distance data and angular data. Content is determined content based upon the position data and the context data, and the content is rendered via the wearable interactive badge.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
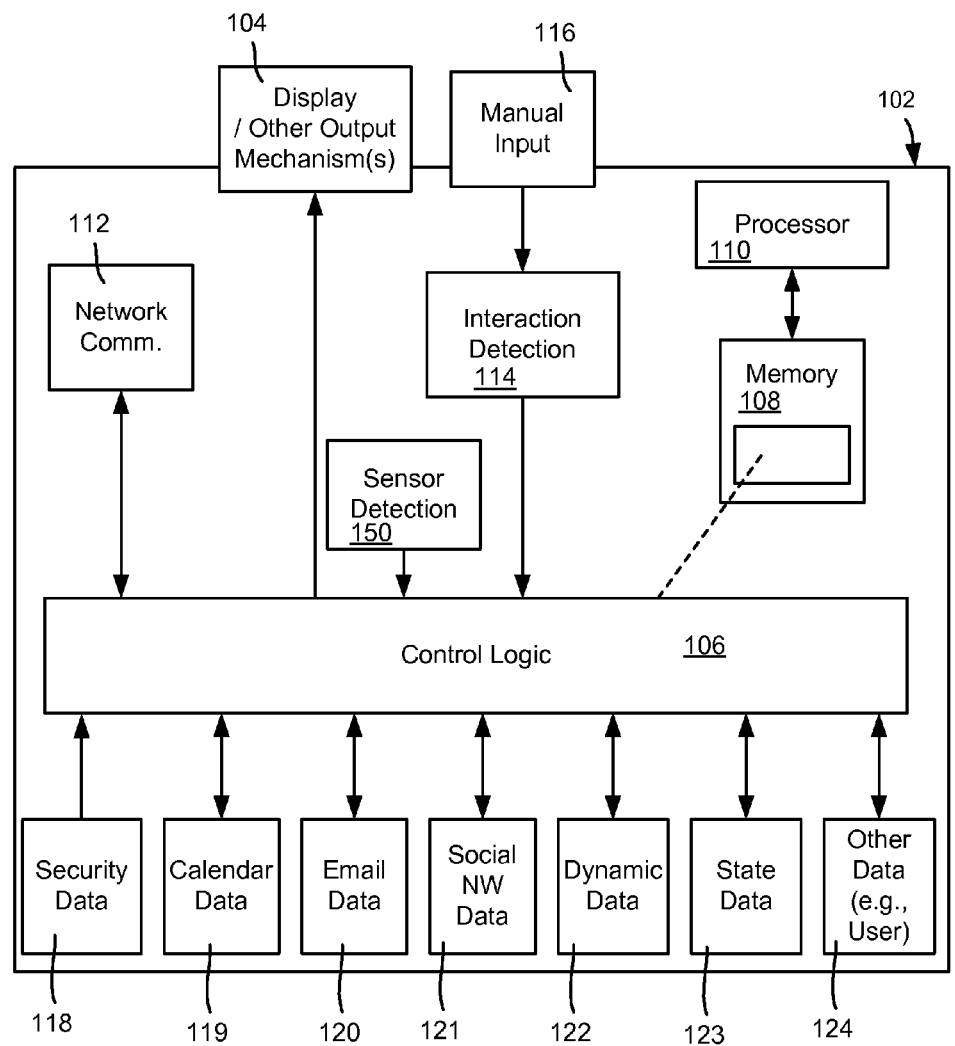
FIG. 1 is a block diagram showing various example components of a generally standalone wearable interactive device such as an interactive badge that may be used to provide relevant output, according to one example embodiment.

Various aspects of the technology described herein are generally directed towards a wearable (including worn, held or otherwise carried) interactive computing device, which may be implemented in the form of an interactive badge, such as an identity badge. The badge incorporates a display screen such as an embedded LCD or bi-stable display that is configured to present dynamic information to the wearer.

The interactive device/badge may be manipulated to change its position relative to the wearer, and this positioning comprises (at least part of) the interaction with the device; for example the position may be used as input data to determine what output such as content/piece of larger content to render on the display screen. As will be understood, the interactive badge provides an easy to use and readily available interactive device that complements other established computing devices, both mobile and generally stationary devices.

Note that as described herein, the term "badge" is often used to describe the interactive device because of the proliferation of such badges in enterprises and the ability to use the interactive device as such a badge. However, the interactive device described herein need not be used as a badge in the conventional sense. For example, a user in a home office may want the benefits provided by such a device, e.g., at-a-glance information that is based on positioning of the device, without the inconvenience of unlocking, even though such a user has no need for an identification badge at home. Still further, the position-based interactive "badge" may be implemented in other wearable forms, such as eyewear, jewelry, wristwatch-type devices, athletic wear (e.g., a wristband) and so on. Thus, the term "badge" is only used herein with respect to examples of one usage model/scenario, and any usage of the term "badge" herein should not be used to limit the interactive device to such a usage model (except where explicitly referred to as such).

As also will be understood, the wearable computing device can operate as a standalone device or as an accessory to a companion device (e.g. a smartphone, laptop, tablet and/or personal computer). In any configuration, the wearable computing device can provide various information to users (e.g., via various applications). In general, the information is provided in a quick and convenient way, including at-a-glance ("glanceable") information.

It should be understood that any of the examples herein are non-limiting. For instance, one interactive badge embodiment is exemplified herein as being incorporated into a traditional enterprise (e.g., corporate or educational institution) identification (ID) badge, but such a device may be worn or carried for any reason, including as a credit or debit card, and thus "badge" is not limited to conventional badge concepts. Further, one example implementation is in the form of a wearable interactive badge that comprises a standalone computing device, however such a device may instead comprise a thin client that communicates with another device, such as a smartphone, to use at least some of the other device's computational power and/or data communication capabilities. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and information technology in general.

FIG. 1 shows a block diagram in which a wearable, interactive computing device 102 such as an interactive identification badge includes a display (block 104) that outputs various (e.g., relevant) content as rendered by control logic 106. For example, the display may comprise a bi-stable display that is always on and only uses power to update the output. A very low power display (that is basically always on) is also acceptable for many usage scenarios, and may be faster than a bi-stable display, (to provide a reasonable frame rate for dynamic graphics), which may be desirable for certain applications.

As also shown in FIG. 1 via block 104 are zero or more other output mechanisms, that is, other forms of output that can be sensed by a human may be used instead of or in addition to display output, e.g., other visible output via LEDs or the like, audio output and/or vibration (haptic) output.

The control logic 106 may be maintained in a memory 108 and executed by a processor 110 (as represented in FIG. 1), and/or may be incorporated into (in whole or part) a hardware chip or the like. As described below with reference to FIG. 2, some or most of the control logic 106 may be on a remote device such as a companion smartphone or laptop that is in communication with the device 102, e.g., via a network communication component 112 (software and/or hardware).

The network communication component 112 may use any wired or wireless technology, e.g., Bluetooth®, Wi-Fi, cellular and/or the like. The network communication network communication component 112 may couple the device 102 to a data source, such as the internet, an intranet and so on; the coupling may be through an intermediary such as a companion device. For example, the network communication component may use a smartphone as an access point.

Figure 4:
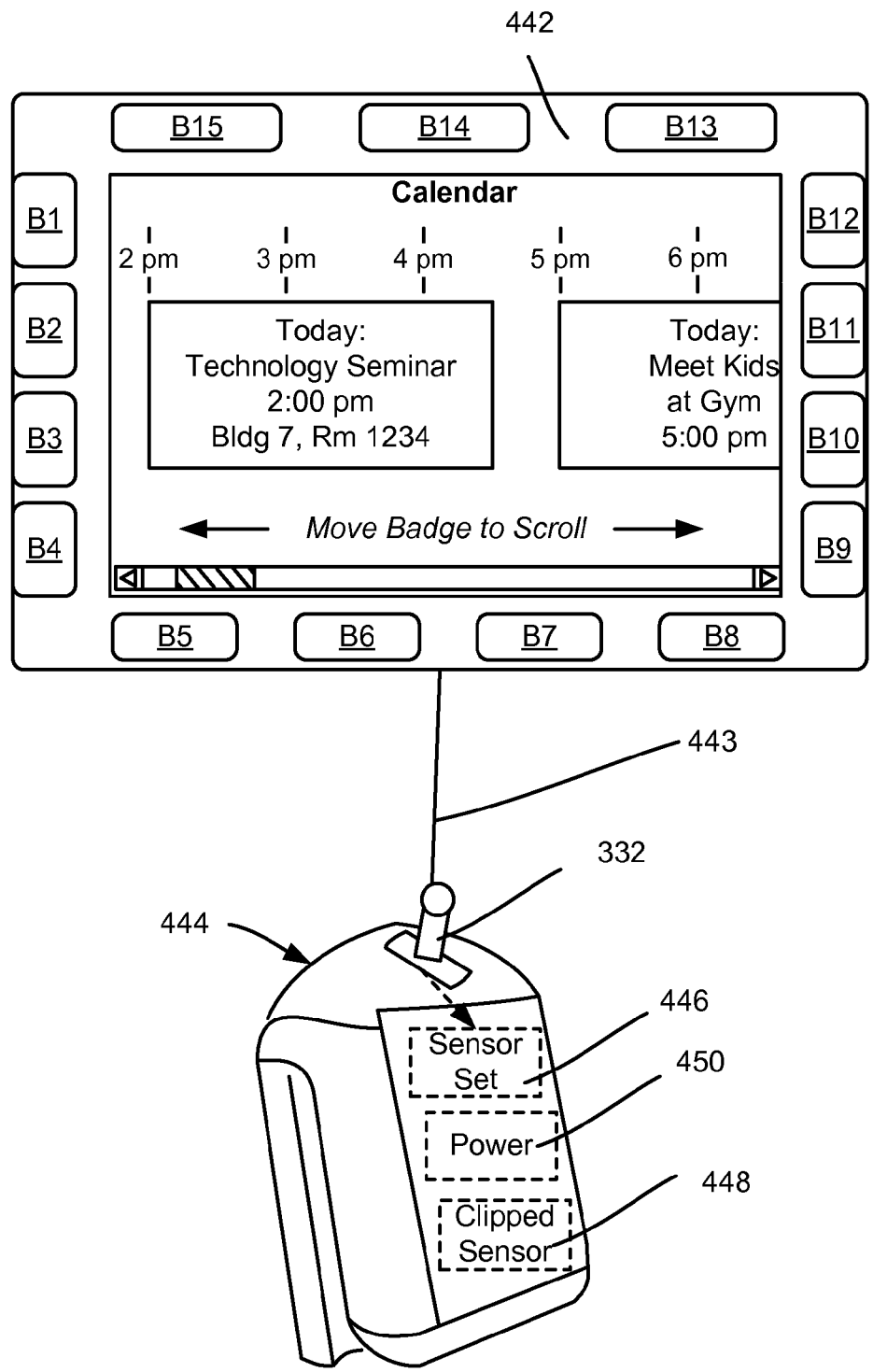
FIG. 4 is a representation of an example wearable interactive device such as an interactive badge comprising a display part and a belt clip part, including sensing component, according to one example embodiment.

As described herein, the control logic 106 receives user interaction data from an interaction detection component 114 or the like. This may include manual input 116 in the form of button presses or the like, and manual positioning relative to the wearer including movement of the device away from and back toward the user, and vertical and horizontal movement. Other sensing may provide tilt, yaw, rotation, orientation data and so forth. Note that the device 102 may be a multiple (e.g., two) piece device, such as one piece that provides the display, and another piece that senses the display position; FIG. 4 shows such a two-piece device comprising a display part coupled to a belt-clip part that senses the relative position of the display part.

User input may comprise any input data received, including via a Natural User Interface (NUI), where NUI generally refers to any interface technology that enables a user to interact with a device in a "natural" manner, such as free from artificial constraints imposed by input devices such as mice, keyboards, remote controls, and the like. Examples of NUI include those based upon speech recognition, touch and stylus recognition, gesture recognition both on screen and adjacent to the screen, air gestures, head and eye tracking, voice and speech, vision, touch, gestures including motion gestures, and machine intelligence. Motion gesture detection may use accelerometers/gyroscopes, facial recognition, 3D displays, head, eye, and gaze tracking, immersive augmented reality and virtual reality systems, which provide a more natural interface, as well as technologies for sensing brain activity using electric field sensing electrodes (EEG and related methods).

Using such input, the device can be used as a personalized general purpose input device. For example, the device may display a QWERTY or other style keyboard that makes use of a language model trained on the user; trained speech recognition likewise may be implemented.

The device may serve as a remote input device that acts as a controller for another device, e.g., one or more personal entertainment devices, a projector, one or more other computers (e.g., as a mouse or pointer), and so forth. This (at least in part) may be via touch or buttons, but may also be done via positioning, motion gestures or speech. For example, moving the device horizontally may change a television channel, moving the device vertically may change the volume. As another example, a computer monitor that is not touch-sensitive (or proximity-sensitive) may be controlled via motion gesture interaction (e.g., directed towards the monitor) so as to simulate a touch screen. A desktop GUI 'clipboard' model may be supported, where clipped content is associated with specific wearable interactive device locations and may be retrieved by holding the wearable interactive device in a relevant position before selecting 'paste' on the desktop.

Position sensing also may be used as an input to a different device/application, e.g., to provide for eyes-free navigation of information, which is then spoken out to the wearer. Turn-by-turn directions to a user that is known to be driving may be output, for example, directly or via communication that is spoken through the car's speakers. Other audio data such as music may be maintained on and output from the device as well.

The control logic 106 may include a rules engine or other model (e.g., machine learned) that decides how to render content based upon user interaction. Context may be computed and used as input, and user preferences, history, and so forth may be used as input data in the decision making. The displayed content may be user configurable to an extent; for example, when the device is held in a certain position, one user may want email data, while another user may want to see calendar data at that same position; each user may specify such preferences. Context may also play a role in what is output, e.g., at the same position on a weekend, rendered calendar content may show a full day (by default), whereas during a weekday, rendered calendar content may show working hours (by default). Location also may be used as context, e.g., if a user has a meeting in the building and he or she enters it the first time (based on history), the user may be shown the map to the meeting room; if the user does not have a meeting or has been to the building before, then he or she can be shown calendar data. Scrolling within an application/rendered such as to see more hours of calendar data or to pan the map image may be accomplished by horizontal and/or vertical movement of the interactive device, for example.

The interaction detection component 114 may provide raw data to the control logic 106 for processing, and/or data that is processed in some way, such as an identifier of which button was pressed, coordinates of the display (e.g., polar or Cartesian) relative to the wearer, e.g., relative to a fixed point associated with the wearer such as the wearer's belt. Thus, the interaction detection component 114 may comprise a sensing interface, and may be one that performs some pre-processing.

Also shown in FIG. 1 is example data (blocks 118-124) that are available to the device 102 and accessible in some form by the control logic 106, exemplified as security data 118, calendar data 119, email data 120, social networking data 121, and dynamic data 122 (e.g., weather, traffic, a downloaded map). State data 123, such as time of day, GPS location data, and so forth also may be accessible in some form to the control logic 106. Still further, other data 124 such as user preference data, user history data and so forth may be known; block 124 also represents any other type of data that may be desirable to have and/or display, e.g., instant messaging data. The device 102 also may incorporate cellular phone and/or data capabilities.

Figure 2:
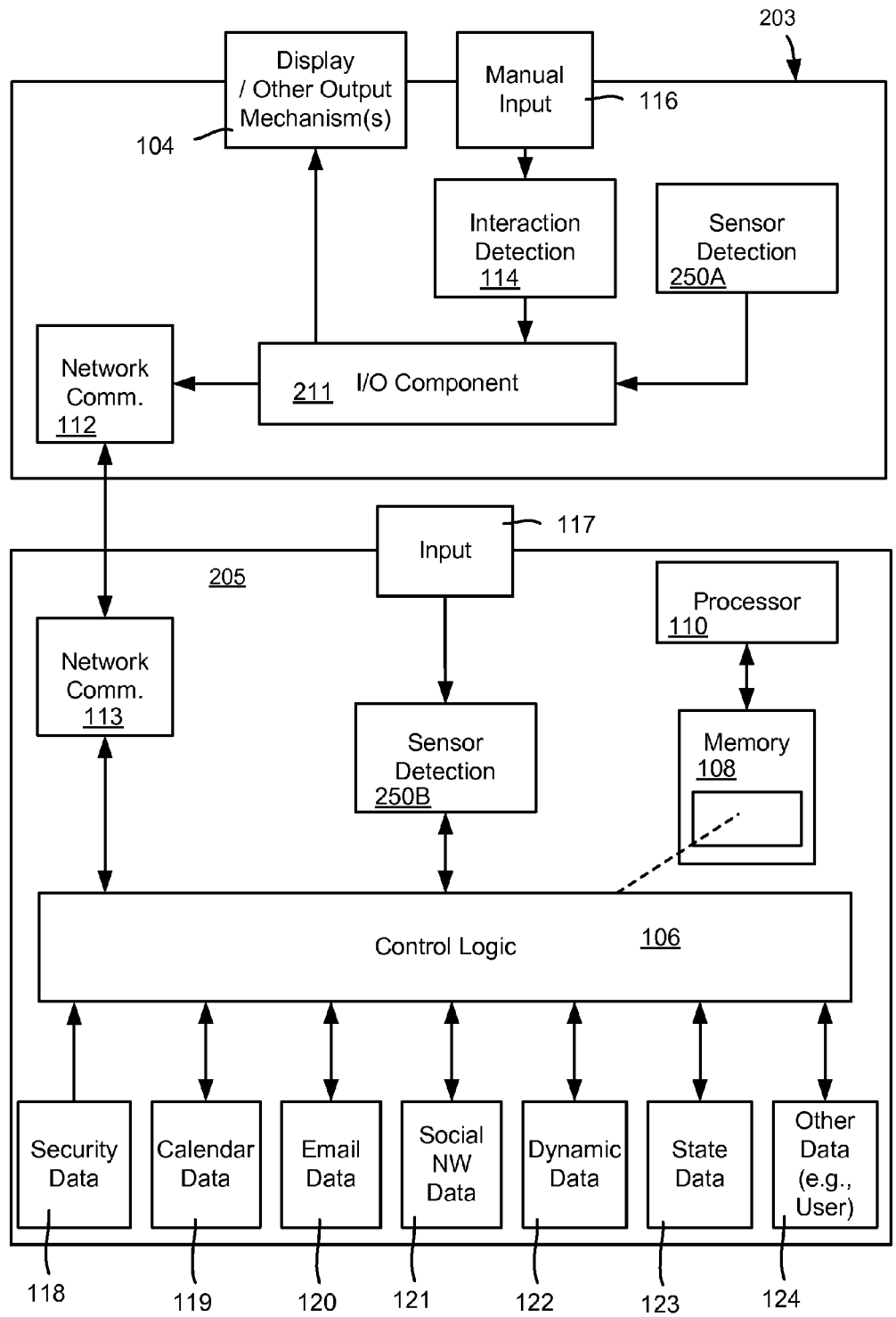
FIG. 2 is a block diagram showing various example components of a wearable interactive device such as an interactive badge along with a coupled companion device, which may be used to provide relevant output, according to one example embodiment.

FIG. 2 represents another example implementation, in which many of the components of FIG. 1 are incorporated into a remote device 205 that is coupled to a wearable device 203. In general, in the example of FIG. 2, the wearable device 203 is basically a thin client that receives (at least some) manual input 116 at an interaction detection component 114, (which may be implemented in a separate part of a two-piece device as in FIG. 4, for example). However, instead of processing the sensed input, the device 203 transmits corresponding input data via an input/output (I/O) component 211 and the network communication component 112 to the remote device 205. The remote device 205 processes the input data, determines what to output, and returns data corresponding to that output (which may be full screen and/or delta data, in any suitable format) to the device 203 for rendering. Some information may be cached locally on the display part of the device 203 instead of always streaming data in real time from the companion remote device 205.

Note that the remote device 205 also may detect some additional input 117 via one or more sensors detected by sensor detection 250B (as described below with respect to FIG. 3B). For example, instead of the device 203 having a GPS receiver, the companion device 205 may have a GPS receiver that provides general location data.

As can be readily appreciated, FIGS. 1 and 2 are only examples, and other models are feasible. For example, a hybrid model may be provided in which the wearable device does most of the data processing, but does not have an internet connection, or does not at times, such as because it does not have a cellular connection to the internet. In such a model, (most of) the data to be processed for output is downloaded by the remote device (e.g., a smartphone) and uploaded to the wearable device as needed, e.g., on demand based upon detected input with the wearable device, or in anticipation of need. Moreover, the wearable interactive device may be implemented via a "badge" application or the like running on a smartphone coupled to a positioning sensor set; the application inputs the sensed position data as (at least some) interactive data, and uses the interactive data to determine the output. In this way, a smartphone with an appropriate application may act as an interactive badge, with interaction detected via a positioning sensor set.

Figure 3A:
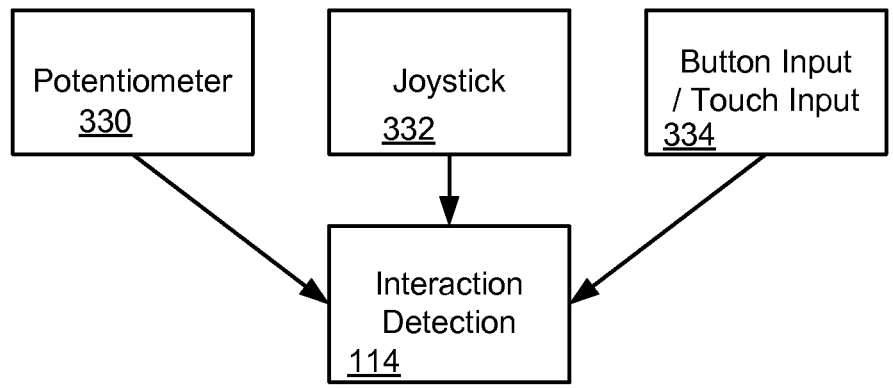
FIGS. 3A and 3B are block diagram showing various example sensors that may be used to provide input relevant to a wearable interactive device, according to one example embodiment.
Figure 3B:
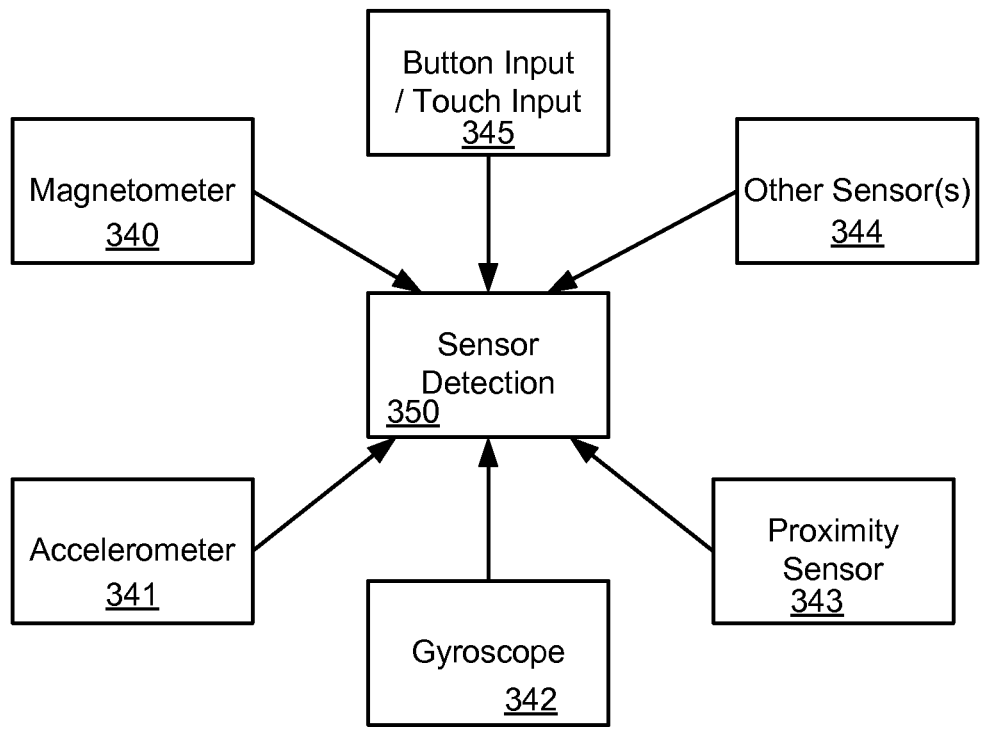

FIGS. 3A and 3B represent example ways in which user positioning and other input data may be received. FIG. 3A may correspond to a wearable device such as that represented in FIG. 4, in which the wearable device comprises a badge/display component 442 coupled to a belt clip component 444 that is configured to be fastened to the wearer's belt. One such belt-worn string and sensor mechanism contains a processor with a digital-to-analog converter, a Bluetooth® module and a battery. Instead of a belt clip component, a lanyard component may provide a similar attachment mechanism for a wearable badge component.

In one example embodiment, a retractable string mechanism allows the wearer to move the device relative to the belt clip component 444, with the movement sensed as interaction data via a sensor set 446. In this way, rather than showing a static image (e.g. the wearer's photo), this interactive version of the ID badge can be dynamically updated based on the wearer's interaction with the device, (and possibly depending on the wearer's context, as described below). Note that the string 443 may comprise conductive cabling or the like that carries signals and/or power. Further note that the string retraction mechanism may reside on the display part of the component.

In the example of FIGS. 3A and 4, a sensor set 446 associated with the retractable string mechanism (that is used to attach the badge to the wearer's belt) can detect the distance from the badge component 442 to the belt clip component 444, and also the relative angle between the badge component 442 and the belt clip component 444. This provides real-time coordinate (e.g., θ, φ and Z, or X, Y and Z) tracking of the display part. From this positioning data, the position (distance and angle in this example) of the badge component 442 relative to the wearer can be determined.

In one example embodiment, interaction with the badge 442 in the Z-direction may be sensed using a potentiometer 330 as shown in FIG. 3A (e.g., a continuously-rotating potentiometer), which senses via coil rotations how far the coiled retractable string is extended. For example, pulling out the entire length of a (e.g., sixty cm) string 443 results in eight complete rotations, giving a sensed resolution of around 0.3 mm. In practice, 1.0 mm resolution in distance sensing is reasonably achieved even without compensating for the non-linearity that exists from the diameter of the coiled string decreasing as it is pulled out, sensor noise, and/or variations that result by the way in which the string 443 actually retracts.

Angular sensing may be achieved by threading the string 443 through the center of a small analog joystick 332 (FIG. 3A) and sensing wiper positions as voltages. An eight bit analog-to-digital conversion process (e.g., the clip processor may contain or be coupled to an analog-to-digital converter) may be used to sample the two wiper positions, providing approximately one degree resolution across a total of fifty degrees, for example.

Button and/or touch sensing (block 334 in FIG. 3A) also may provide input; FIG. 4 shows buttons B1-B15, however it is understood that any practical number may be present in a given implementation as desired. Indeed, to facilitate one-handed operation, a "squeeze" (pressure) sensor set or the like may be more desirable than a button or multiple buttons. Further, if multiple buttons are used, some or all of the buttons may have the same meaning; e.g., only two states may exist, pressed or not pressed, whereby pressing any button or combination of buttons causes the pressed state, similar to a squeezed or not squeezed state. Thus, blocks 334 and 345 represent any other kind of manual input that may be detected, including touch proximity anywhere on the device including the screen, speech, button press, squeeze and so on.

FIG. 3B shows other sensors 340-345 that may be incorporated into a wearable device to alternatively sense interaction and/or further extend interaction, (e.g., in addition to or instead of one or more of the sensors of FIG. 3A). Note that one or more of the sensors of FIG. 3B may be on the wearable device, shown via sensor detection component 150 in FIGS. 1 and 250A in FIG. 2, however one or more also may be present on a companion device such as a smartphone. Thus, the exemplified sensor detection component 350 in FIG. 3B may be on the wearable device, partly on a companion device (as in FIG. 2, where the component 250B also senses some input), and/or appropriately split between both.

FIG. 3B shows a magnetometer 340, accelerometer 341, gyroscope 342, proximity sensor 343, and one or more other sensors 344 (such as an altimeter, inclinometer, potentiometer, joystick, and/or a directional control pad (D-pad) and the like). Button and/or touch sensing is also shown via block 345. Not all of these sensors may be present in a given embodiment, but if present, may be used to determine relative positioning of a wearable device. For example, distance, direction, tilt and orientation may be sensed by a combination of data from the magnetometer 340, accelerometer 341 and gyroscope 342; distance may be detected relative to a locally-generated electromagnetic field for the relative tracking, for example. In a string embodiment as shown in FIG. 4, orientation relative to the string 443 (not just coordinates relative to the clip) may be sensed and used to as interaction data. Context, such as whether a person is driving, walking or is stationary may be deduced from such sensor data, possibly in combination with one or more other sensors, such as a GPS sensor.

Distance sensing may be achieved in other ways, e.g., a string that alternates between black and white lengths (or other colors) may trigger a sensor that counts color changes. This may be more granular than distance provided by a potentiometer, however for certain applications this may be sufficient. For example, consider an interactive badge that has only three distinguishable distance positions, nearby (e.g., retracted), medium distance and far (fully or near fully extended) distance. Combined with angular sensing these three distance settings may be sufficient to provide a useful amount of at-a-glance data. Further, with (or even without) angular data, the amount of data provided with granular distance differentiations may be significant. For example, a user may shake the device at the same approximate distance, with the shaking sensed to alternate between displayed application content, such as calendar data, email data, traffic data and so on, with scrolling, panning, zoom and so on available as appropriate for the currently selected application if angular sensing is present.

Angular sensing also may be based on the joystick and/or other sensors. This may include the angle of the badge relative to the environment/gravity (e.g., sensed with an accelerometer) and/or the angle of the device relative to a worn part, as described above.

The displayed content thus may change based upon the interactive positioning of the device to the wearer, rather for example than via interactive unlocking, followed by selection of an application from a home page or the like, and possibly further interaction. For example, with the wearable interactive device, in a quick glance scenario, a user may tilt the device without moving it much away from himself or herself, whereby content for that position is rendered to provide quick glanceable information (e.g., calendar data during working hours, traffic information just before or after working hours). However, if the user pulls the device away from himself or herself, different content may be displayed, such as an interactive map. The use of the various sensors facilitates an automatic transition between a passive (glanceable) display and active display modes, e.g., based upon the position of display relative to the wearer.

Further, information that is seen by others may differ from that displayed for personal consumption; using various known display technologies, for example, the wearer viewing the device at one angle, e.g., an oblique angle when retracted to the belt, may see personal content, while others seeing the device at a more direct angle instead see content for public consumption, such as identity badge output.

For a given application, a user may move a device right, left up or down to scroll as if the device was a viewport to a larger piece of content/image, e.g., a virtual canvas. A user may zoom in and out, e.g., by moving the device in the Z-direction. With appropriate sensors, gesture input (on-screen or motion gestures) also may be used. For example, a shaking motion and/or horizontal back and forth and/or vertical up and down gesture with the device (e.g., that is too fast to be practical for scrolling, panning or zooming) may be sensed to change the content or application instead of scrolling, panning or zooming.

Indeed, the examples of FIG. 3A and/or FIG. 3B show a mechanism that supports various forms of interaction, including the ability to pan the display around a larger virtual image and/or to navigate between different types of digital information. For example, in another scenario generally represented in FIGS. 5A and 5B, extending the wearable device 442 at different angles facilitates interaction with an interactive map.

In this application, when the badge is pulled appropriately away from the belt, the system activates a building floor plan display application providing a virtual map of the entire floor of a building laid out in front of the user at approximately waist height. The user sees part of the map on the display, and may reveal any part of the map by moving the display to the associated part of the virtual space and pressing a button on the display bezel. If the button is held down, it is possible to pan the display and the associated view, and it is also possible to move the display up and down to move to a different floor in the building. If part of the map needs to be consulted for longer, releasing the button may be used to freeze the display. When the wearer wants to finish the interaction, releasing the display allows the device to retract back to the belt clip, whereupon an identity badge image is displayed once again and the badge returns to a very low power mode.

Note that the gain may be set to make usage more straightforward, and may depend on the zoom level. For example, a 1.0 cm movement of the display resulting in the image scrolling 1.0 cm to the left, may be useful sometimes, but is not ideal in all situations. For example, when a user is seated at a desk or table, the user may want a high gain so as to navigate a relatively large virtual canvas without moving the display over large distances. The natural increase in resolution of sensed lateral position also may be leveraged, e.g., when the display is closer to the belt clip, finer interaction movements may be provided so that the device remains easy to use when the user is seated or in a situation where large movements are not be appropriate.

Further, a number of additional interaction techniques may be provided, such as a traditional "clutching" model using one of the bezel buttons. Clutching occurs when the device is fully extended and thus cannot be moved far enough in one direction such as more left to see or scroll to a desired part of an image or other content. By holding down a button, for example, or squeezing, the user may move the device back towards the center (towards the right in this example) without panning or scrolling; when the user releases the non-panning state, e.g., lets up the button or stops squeezing, the panning functionality returns. Zoom may likewise be temporarily and controllable frozen in such a manner. Note that other techniques may be used instead of button interaction or the like; for example, a flick motion gesture may be detected that impacts the panning (or zooming) state, the user may turn the device roughly ninety (or one-hundred-and-eighty) degrees to enter a non-panning and/or non-zooming state until turned back to restore, and so on. For example, a flick right may pan more than a gentle motion to the right.

Bezel buttons also may be used as hot-key shortcuts that reset the virtual canvas to a particular position (e.g., depending on the hotkey pressed). Any of the above buttons and other techniques may be customized by the user.

As can be readily appreciated, other applications may provide other useful output. For example, by adding a camera, the device may be used as a virtual reality display, e.g., to display overlaid text that describes what is in the camera's view. A virtual information display may provide for accessing calendar data, accessing contacts, email, notes browser, maps and so forth, including via automatically mined contextual information such as the next appointment, traffic conditions, peoples' names, the next bus time and so forth.

Thus, described herein are some of the many possible interaction techniques available via the device positioning and other interaction, including panning around a larger piece of content, with clutching capabilities if necessary; zoom and image orientation by lifting up and down and/or extension/retraction and so forth. The zoom may be semantic, e.g., classic 'zoom' interaction where the image is magnified as the display is moved towards the eye may be augmented by adding more details to the image at certain magnification thresholds. Other types of output information may be layered, such as in FIGS. 5A and 5B.

Figure 5A:
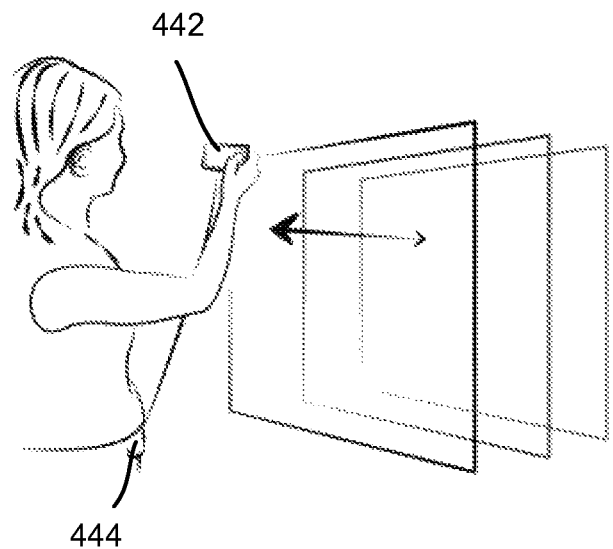
FIGS. 5A and 5B are representations of an example wearable interactive device such as an interactive badge in example positioning-based usage scenarios, according to one example embodiment.
Figure 5B:
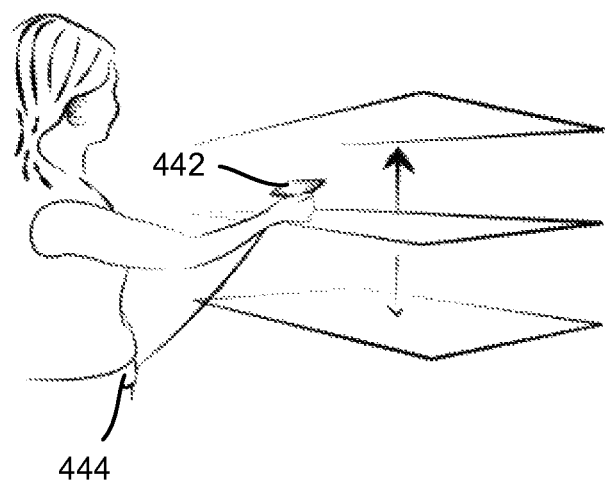

As can be seen in FIGS. 5A and 5B, the device imposes no location system infrastructure requirements, and instead naturally creates an interaction space that is 'pinned' to the wearer; as the wearer moves around the interaction space follows the wearer. As long as the belt clip is worn in a consistent position, the user may develop a clear spatial model of interaction zones and layers, as well as other content. For example, a user may learn to extend the device at waist height to show calendar appointments, at chest height to show emails or adjacent to the hip (with little extension) for a traffic update.

The interactive device also provides for additional functionality. For example, consider social settings, in which part or all of the display implements a color scheme that can distribute information to others, such as to help in meeting others with similar interests, show likes and dislikes, and so forth. The device also may be used to broadcast information to wearer, e.g., when attending a large meeting, an employee in finance sees a red display and knows to sit in the red section, since that is reserved for the finance group; other groups have other colors and seat locations.

Turning to security aspects, a typical conventional ID badge provides an image/picture of the person wearing it, and many times the badge is readable to allow access to specified locations, such as building and/or rooms. The interactive badge may likewise have such features, including, if desired, a regular ID image/picture on the back or front (or vice-versa) so that the interactive badge still works as conventional badge without power or if something fails, e.g., the screen gets cracked, the display freezes on a non-security image, and so on. However, because of the interactive nature of the interactive badge/device, additional security features may be provided.

For example, based upon context, a badge may be used as a key to a room that otherwise denies the badge holder access. The key (entry credentials) may comprise a digital signal, barcode, QR code and so forth sensed by a lock at the door. A virtual keypad or the like may be provided on the display, with the code (which may be a temporary code) needing to be entered to activate entry credentials. The context may include the date and time of day, expected attendees to an event, one-time visitor permission granted by an overseer, and so forth. Note that if a companion device is used, both the main device as well as the companion device may need to be present, to make access even more challenging to an inappropriate user in the event of theft, regardless of whether an entered code is also used.

The badge also may be used to unlock a user's devices. For example, instead of having to log into/unlock an office computer, tablet, smartphone and anything else needing credentials such as protected files, the presence of the interactive badge may be sensed and used for this purpose. Unlike a smartcard chip, the communication may be automatic and regular, e.g., so that the devices automatically lock/log out when the interactive badge is not in communication. Passwords or the like may be exchanged among the devices so that changes need not be made at each device. Interaction with the badge, which may be based upon manual positioning as described herein, may trigger the unlocking/locking actions.

Further, because the device is intended to provide rapid, glanceable information, it may be generally undesirable to lock the interactive badge/device, at least for most applications (there may be predetermined exceptions such as highly secretive data that always needs additional credentials to access). One way to provide such convenience while maintaining security is to have the device remain unlocked while the device is clipped to the user's belt. For example, the user may need to unlock the device at the beginning of the day when first attaching the clip, but thereafter need not unlock the device for use as long as the device remains clipped (or at least for some number of hours), and thus have convenient access to desired information. A "clipped" state sensor 448 (FIG. 4) may provide the state information to the device 442, such as via regular heartbeats that ensure that any unclipped state is detectable. A lanyard may similarly have a magnetic coupling or the like that detects whether the badge is still coupled thereto.

Biometric sensors as well as other sensors and data also may be used in conjunction with the interactive device for security (and other) purposes. These may be used to sense atypical situations and "raise flags" (and likely re-lock the device) if an exception is triggered, such as when the device remains clipped to the belt but the user has changed clothes, leaving the device in an unlocked state. For example, a person's gait (or other movement habits) may be sensed and thus is learnable, whereby detection of a different gait may indicate that another person is walking off with the device. The history of location data versus the current location may be compared, e.g., if the device is moved to an unfamiliar location, the device may automatically lock and necessitate a manual or biometric (e.g., fingerprint or retina/iris scan) unlocking procedure.

Other features of conventional badges may be enhanced by the interactive nature of the interactive device. For example, many enterprises allow a user to purchase food at the enterprise cafeteria via an identity badge. The interactive badge can be used to do the same, but also to show the user the remaining balance if paid in advance or current balance owed. Indeed, the interactive device may be used as a credit card or debit card, which allows viewing balances and allows payments/deposits/withdrawals to be made, and so forth.

Turning to power-related aspects, the device may be internally and/or externally powered by a battery and/or capacitor. The belt clip or lanyard also may contain a power source 450 such as a battery or other power source; although shown in the belt clip component 444, it is understood that only one of the two parts may need a power source, e.g., the other may be powered or charged via the string 443 (e.g., with a two-conductor cable therein). Charging may be direct or inductive, and indeed, pulling and/or retracting the string 443 may itself generate power that charges the power source or sources. Data transfer (e.g., synchronization) may occur at any time, including when the string 443 is extended. Data transfer may be selective, e.g., transfer email and traffic data because the string 443 is extended such that one of the two (or both) are needed at that extension distance. For non-string implementations, contact-based charging may occur when coupled to the belt or lanyard in some other manner, e.g., magnetically, or inductively when sufficiently close to a charging mechanism.

Figure 6:
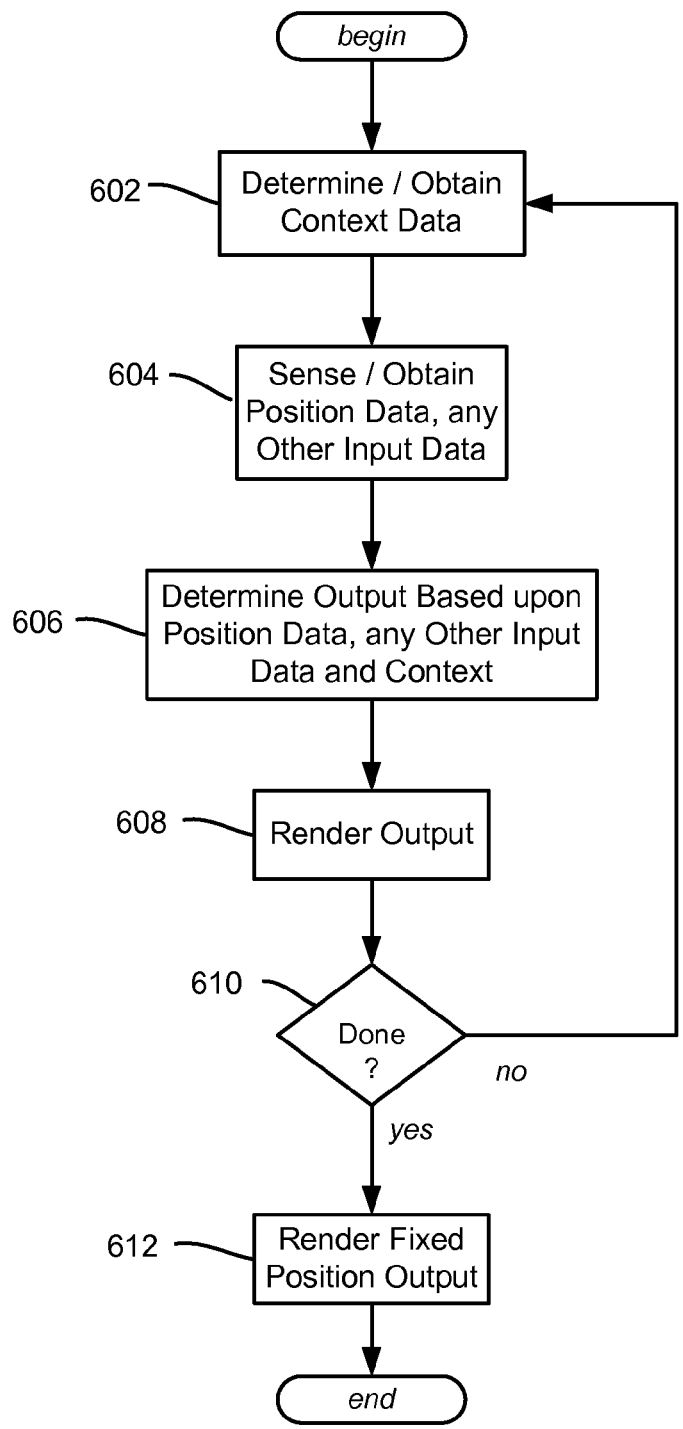
FIG. 6 is a flow diagram showing example steps taken to process input data, including positioning data of a wearable interactive device, into relevant output, according to one example embodiment.

FIG. 6 summarizes some of the various aspects described herein in the form of an example flow diagram. Step 602, which for example may begin anytime the user has some actual, detectable interaction with the device, represents determining the current context from various input data, such as state data and the like. Step 604 represents sensing and obtaining position data, along with any other input data. Initially, this may include some delay during the manual movement/positioning to allow the user to move the device to a desired position and hold it there.

Step 606 represents determining what to output based upon the position data, any other input data and the current context. As described above, the output may be visible, audible and/or tactile, and, for example, the context may determine whether the output is visible, audible and/or tactile, as well as the content that is output. Step 608 represents rendering the output.

The process repeats until done, allowing for further interaction via position changes, context changes, and any other input changes, e.g., button presses, gestures and so forth. Step 610 represents determining when the user is done, e.g., the user releases the device and it retracts to the belt or lanyard, or the position is otherwise is detected such that the device is known to be in its "fixed" default output location relative to the user. When done, step 612 renders the fixed position output, e.g., showing an identification badge (although as described above, the default fixed output position may depend on the viewing angle).

As can be seen, there is described a type of wearable computing device. If the device is used as an interactive identity badge, the device replaces a familiar mechanism with an interactive electronic device, whereby the burden of wearing the device is very low. Interaction may be based upon positioning of the wearable device, e.g., by sensing movement of a retractable string that attaches an interactive identity badge to the wearer's belt or lanyard. This form-factor makes it possible to interact using a single hand, providing lightweight and immediate access to a variety of information, including when it is not convenient to pick up, unlock and interact directly with another computing device such as a smartphone. By being readily on-hand and available, the device may provide a quicker and easier way to access information than established mobile devices and can fulfill another role, e.g., as an identity badge.

The device supports consumption of glanceable information with single-handed operation. For example, the wearer can quickly manipulate the display in 3D space to navigate information intuitively, even when only a couple of seconds of interaction are desirable. Scenarios include access to email, social networking, calendar appointments and online services such as search, mapping, weather forecasting and traffic updates. Furthermore, this approach may provide an alternative to active notifications in some scenarios by displaying information in a more passive, glanceable manner.

In one retractable string implementation, simply 'letting go' of the device ends the interaction. Unlike touch-based interaction, the retractable string mechanism avoids occlusion of the display without unduly restricting the range of input.

EXAMPLE OPERATING ENVIRONMENT

As mentioned, advantageously, the techniques described herein can be applied to any device. It can be understood, therefore, that handheld, portable and other computing devices and computing objects of all kinds including multi-component configurations (that include a display component for example) are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
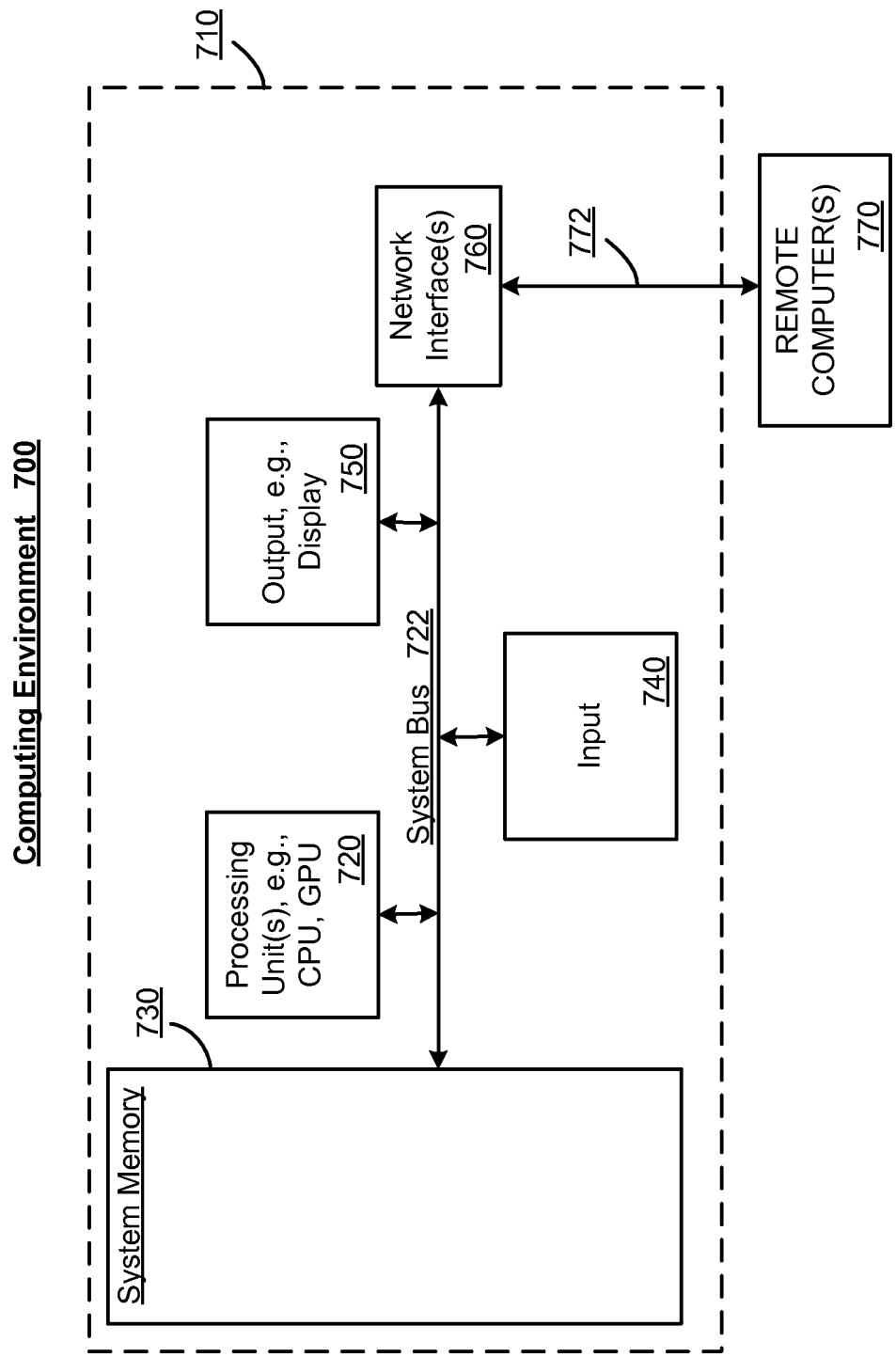
FIG. 7 is a block diagram representing an example computing environment into which aspects of the subject matter described herein may be incorporated.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer-readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed at least in part on at least one processor, comprising:
manipulating a first piece of a multi-piece wearable interactive device relative to a second piece of the multi-piece wearable interactive device, the second piece being connected to the first piece by a connecting wire and a sensor mechanism and worn by a wearer of the device to provide position data, the sensor mechanism includes at least one sensor that senses the position data including a distance of the first piece of the multi-piece wearable interactive device relative to the second piece of the multi-piece wearable interactive device based upon movement of the connecting wire;
sensing a position of the first piece of the multi-piece wearable interactive device relative to the second piece of the multi-piece wearable interactive device to provide the position data based on the manipulation;
determining, based at least in part upon the position data, an output to be rendered via the multi-piece wearable interactive device; and
rendering the output via the multi-piece wearable interactive device based upon the determination.

2. The method of claim 1 further comprising, using context data to determine the output that is rendered via the multi-piece wearable interactive device.

3. The method of claim 1, wherein sensing the position of the first piece of the multi-piece wearable interactive device to provide the position data comprises sensing coordinates corresponding to the distance, a vertical angle and a horizontal angle.

4. The method of claim 1, further comprising: obtaining data from a remote device corresponding to at least part of the output to be rendered via the multi-piece wearable interactive device, or obtaining content from a remote device corresponding to the output to be rendered via the multi-piece wearable interactive device.

5. The method of claim 1, wherein the output comprises a displayed representation of a part of content, and wherein rendering the output via the multi-piece wearable interactive device comprises panning, scrolling, or zooming, or any combination of panning, scrolling or zooming to display a different representation of the content as the position data is changed.

6. The method of claim 1, wherein rendering the output via the multi-piece wearable interactive device comprises at least one of rendering a badge image when there is no manual interaction, outputting control data for controlling a remote device, and unlocking a remote device.

7. The method of claim 1, further comprising: inputting touch-based data, proximity-based data, gesture-based data, button-based data, pressure-based data, magnetometer-based data, accelerometer-based data, or gyroscope-based data, or any combination of touch-based data, proximity-based data, gesture-based data, button-based data, pressure-based data, magnetometer-based data, accelerometer-based data, or gyroscope-based data.

8. The method of claim 1, wherein rendering the output via the multi-piece wearable interactive device comprises augmenting an image of the rendered output with virtual data.

9. In a computing environment, a system comprising:
a multi-piece wearable interactive device that includes at least one processor programmed to:
determine a position data of a first piece of the multi-piece wearable interactive device based at least in part on interaction with the multi-piece wearable interactive device, the position data being determined relative to a second piece of the multi-piece wearable interactive, the second piece being connected to the first piece by a connecting wire and a sensor mechanism and worn by a wearer of the device to provide the position data, the sensor mechanism includes at least one sensor that senses the position data including a distance of the first piece of the multi-piece wearable interactive device relative to the second piece of the multi-piece wearable interactive device based upon movement of the connecting wire; and
render output content, in which the output content is rendered based at least in part upon a position of the first piece of the multi-piece wearable interactive device relative to the second piece of the multi-piece wearable interactive device.

10. The system of claim 9, wherein the multi-piece wearable interactive device includes a rules engine configured to render the output content.

11. The system of claim 9, wherein at least a part of the multi-piece wearable interactive device comprises an identity badge.

12. The system of claim 9, wherein the sensor mechanism further comprises at least one sensor that provides at least one angle of the first piece of the multi-piece wearable interactive device relative to the second piece of the multi-piece wearable interactive device.

13. The system of claim 9, wherein the first piece comprises a display part and the second piece comprises a belt clip part, and wherein at least a part of the sensor mechanism is incorporated into the belt clip part.

14. The system of claim 13, wherein the belt clip part provides at least some power to another part of the multi-piece wearable interactive device, or wherein the belt clip part receives at least some power from another part of the multi-piece wearable interactive device.

15. The system of claim 9, wherein the multi-piece wearable interactive device learns a gait of an authorized wearer of the multi-piece wearable interactive device over a period of time and detects a change in gait upon a different person wearing the multi-piece wearable interactive device.

16. The system of claim 9, wherein the rendered output comprises panning, scrolling, or zooming, or any combination of panning, scrolling or zooming to display a different representation of the content as the position data is changed.

17. The system of claim 9, wherein the rendered output comprises augmenting an image of the rendered output with virtual data.

18. One or more computer devices storing computer executable instructions, which on execution perform operations, comprising:
manipulating a first piece of a multi-piece wearable interactive badge relative to a second piece of the multi-piece wearable interactive badge, the second piece being connected to the first piece by a connecting wire and a sensor mechanism and worn by a wearer of the multi-piece wearable interactive badge, the manipulation being based on an interaction of the wearer with the multi-piece wearable interactive badge, the sensor mechanism includes at least one sensor that senses position data including a distance of the first piece of the multi-piece wearable interactive badge relative to the second piece of the multi-piece wearable interactive badge based upon movement of the connecting wire;

determining content based upon the position data; and rendering the content via the multi-piece wearable interactive badge based at least in part upon a position of the first piece of the multi-piece wearable interactive badge relative to the second piece of the multi-piece wearable interactive badge.

19. The one or more computer devices of claim 18, wherein the multi-piece wearable interactive badge is configured to sense an atypical situation and raise a flag.

20. The one or more computer devices of claim 18 storing further computer executable instructions, which on execution perform operations comprising:

obtaining context data; and determining the content based upon the position data and the obtained context data.

* * * * *